(12) United States Patent
Kim

(10) Patent No.: US 7,284,123 B2
(45) Date of Patent: Oct. 16, 2007

(54) SECURE COMMUNICATION SYSTEM AND METHOD FOR INTEGRATED MOBILE COMMUNICATION TERMINALS COMPRISING A SHORT-DISTANCE COMMUNICATION MODULE

(75) Inventor: Hoe-Won Kim, Seoul (KR)

(73) Assignee: Samsung Electroncis Co., Ltd. (KR)

( * ) Notice: Subject to any disclaimer, the term of this patent is extended or adjusted under 35 U.S.C. 154(b) by 679 days.

(21) Appl. No.: 10/756,618

(22) Filed: Jan. 13, 2004

(65) Prior Publication Data

US 2004/0147246 A1 Jul. 29, 2004

(30) Foreign Application Priority Data

Jan. 14, 2003 (KR) .................. 10-2003-0002446

(51) Int. Cl.
*G06F 1/24* (2006.01)
(52) U.S. Cl. ............... 713/163; 713/168; 713/171
(58) Field of Classification Search ........... 713/163, 713/168, 171
See application file for complete search history.

(56) References Cited

U.S. PATENT DOCUMENTS

| | | | |
|---|---|---|---|
| 4,833,469 A | * | 5/1989 | David .................. 340/901 |
| 5,043,736 A | * | 8/1991 | Darnell et al. .......... 342/357.1 |
| 5,189,612 A | * | 2/1993 | Lemercier et al. ............ 701/23 |
| 5,218,620 A | * | 6/1993 | Mori et al. ................. 375/142 |
| 2002/0065099 A1 | | 5/2002 | Bjorndahl |
| 2002/0157002 A1 | | 10/2002 | Messerges et al. |

FOREIGN PATENT DOCUMENTS

| | | |
|---|---|---|
| EP | 1 274 194 | 8/2003 |
| WO | WO98/35474 | 8/1998 |
| WO | WO 02/33883 | 4/2002 |

* cited by examiner

*Primary Examiner*—Thomas R. Peeso
(74) *Attorney, Agent, or Firm*—The Farrell Law Firm, P.C.

(57) ABSTRACT

Disclosed is an encryption code for encrypting data to be transmitted or received during short-distance communication, namely, an encryption key generator for generating an encryption key, in order to transmit the encryption key to an integrated mobile communication terminal and a service terminal during short-distance secure communication. The two terminals encrypt data using the encryption key and receive or transmit the data, thereby implementing authentication and secure communication.

11 Claims, 7 Drawing Sheets

SECURE COMMUNICATION SYSTEM AND METHOD FOR INTEGRATED MOBILE COMMUNICATION TERMINALS COMPRISING A SHORT-DISTANCE COMMUNICATION MODULE

PRIORITY

This application claims priority to an application entitled "Secure Communication System and Method for Integrated Mobile Communication Terminals Comprising a Short-Distance Communication Module" filed in the Korean Intellectual Property Office on Jan. 14, 2003 and assigned Ser. No. 2003-2446, the contents of which are hereby incorporated by reference.

BACKGROUND OF THE INVENTION

1. Field of the Invention

The present invention relates to an integrated mobile communication terminal comprising a short-distance communication module, and more particularly to a system and a method for short-distance secure communication using integrated mobile communication terminals.

2. Description of the Related Art

It is a current trend that mobile communication terminals are becoming more integrated than existing mobile telephones for voice communication through the inclusion of various short-distance communication modules to manage and share various security or non-security data. Also, such mobile communication terminals are used for personal authentication and as means for payment in personal transactions. Due to the development of wireless communication technology, current mobile communication systems can transmit mass data. However, those systems still incur higher costs in mass data transmission than existing wire or short-distance communication methods. Therefore, it would be natural to prefer various short-distance communication methods implemented by integrated mobile communication terminals (hereinafter referred to as "integrated terminals") for mass data exchange, rather than using mobile communication systems.

Generally, authentication and secure communication implemented by mobile communication systems are not possible between two terminals compatible with short-distance communication devices, such as Bluetooth, IrDA, USB, UART (serial communication) and Parallel communication devices. Although limited authentication can be made between terminals for secure communication during the setting of systems such as Bluetooth, there is no method for authentication and secure communication being widely applicable to short-distance communications. Although terminals of mobile communication systems provide authentication through user modules (serial numbers of IMEI (International Mobile Equipment Identity) in the case of GSM), they are different from short-distance communication methods, because the authentication is made on a national scale or in the mobile communication network as a whole.

Therefore, it is required to provide authentication and secure communication widely applicable to short-distance communication between general short-distance communication modules.

SUMMARY OF THE INVENTION

Accordingly, the present invention has been made to solve the above-mentioned problems occurring in the prior art, and an object of the present invention is to provide a system and a method for short-distance secure communication using integrated mobile communication terminals.

In order to accomplish this object, there is provided a method for short-distance secure communication comprising the steps of: demanding generation of an encryption key, if secure communication is required during short-distance communication between an integrated mobile communication terminal and another terminal; generating an encryption key by an encryption key generator according to the demand for encryption key generation and transmitting the encryption key to the integrated mobile communication terminal and the other terminal; and performing data encryption using the encryption key by the integrated mobile communication terminal and the other terminal to implement short-distance wireless communication.

In accordance with another aspect of the present invention, there is provided a short-distance secure communication system comprising: an integrated mobile communication terminal, which comprises a short-distance wireless communication module, for demanding generation of an encryption key, if secure communication is required during short-distance communication between the integrated mobile communication terminal and another terminal, and for encrypting and decrypting data received or transmitted during short-distance wireless communication with the other terminal using an encryption key which has been received; and an encryption key generator for generating an encryption key according to the demand for encryption key generation and transmitting the encryption key to the integrated mobile communication terminal and the other terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

The present invention provides an encryption code for encrypting data to be transmitted or received during short-distance communication, namely, an encryption key generator for generating an encryption key, in order to transmit an encryption key to an integrated mobile communication terminal and a service terminal during short-distance secure communication. The two terminals encrypt data using the encryption key and receive or transmit the data, thereby implementing authentication and secure communication.

Systems to which the present invention is applicable can be of various constructions. For example, the encryption key generator can be provided as an independent node of a mobile communication system or included within the system. Alternatively, the encryption key generator can be included in an information providing service terminal which provides mass information through short-distance communication. The present invention will be described with reference to a first embodiment including the encryption key generator in a service providing terminal and a second embodiment providing the encryption key generator as an independent node of a mobile communication system.

The first embodiment of the present invention will be explained in more detail in conjunction with FIGS. 1 to 6.

Figure 1:
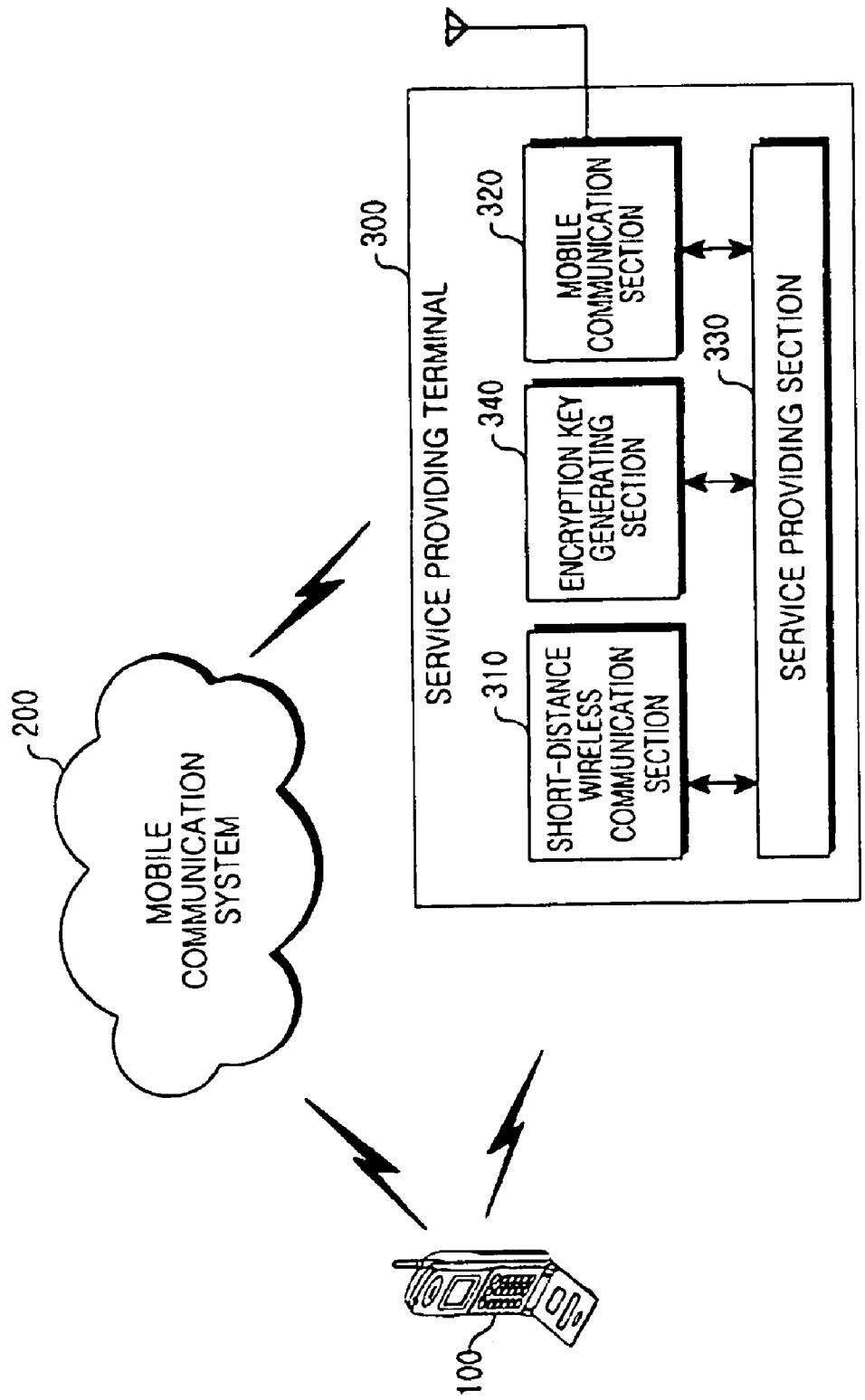
FIG. 1 is a construction diagram of a communication system according to a first embodiment of the present invention.

FIG. 1 shows the construction of a secure communication system according to the first embodiment of the present invention. The secure communication system comprises an integrated mobile communication terminal ("integrated terminal") 100, a mobile communication system 200 and a service providing terminal 300.

The mobile communication system 200 is a generally available mobile communication system. According to the present invention, the mobile communication system 200 transmits an encryption key and a key ID, which have been received from the service providing terminal 300, to the integrated terminal 100.

Figure 2:
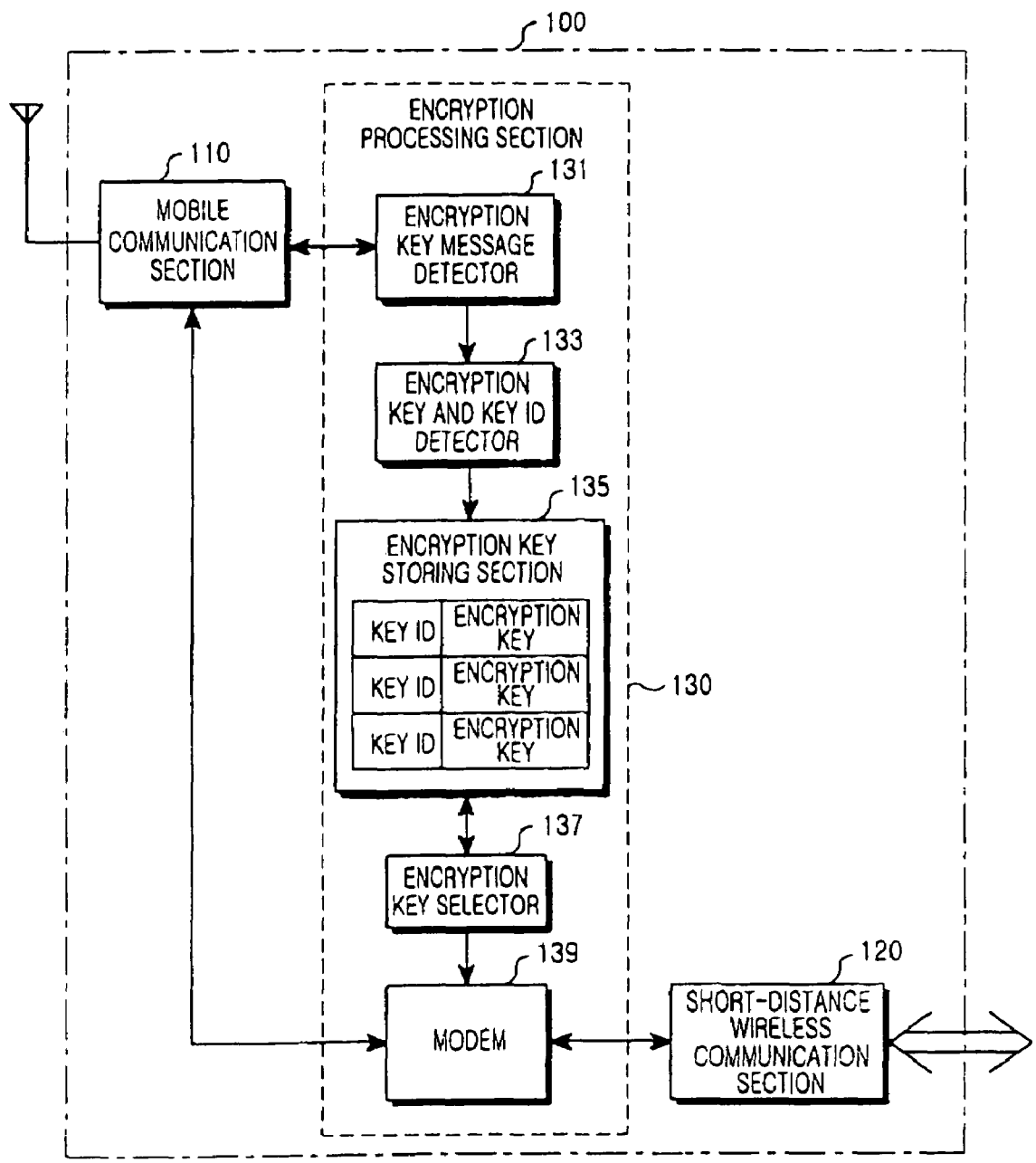
FIG. 2 is a construction diagram of an integrated mobile communication terminal according to the first embodiment of the present invention.

The integrated terminal 100 is a mobile communication terminal comprising a short-distance communication module. According to the present invention, the integrated terminal 100 comprises an encryption processing section for encrypting and decrypting data and performs secure communication using the encryption key and key ID received from the service providing terminal 300. The detailed construction of the integrated terminal 100 is illustrated in FIG. 2.

Figure 3:
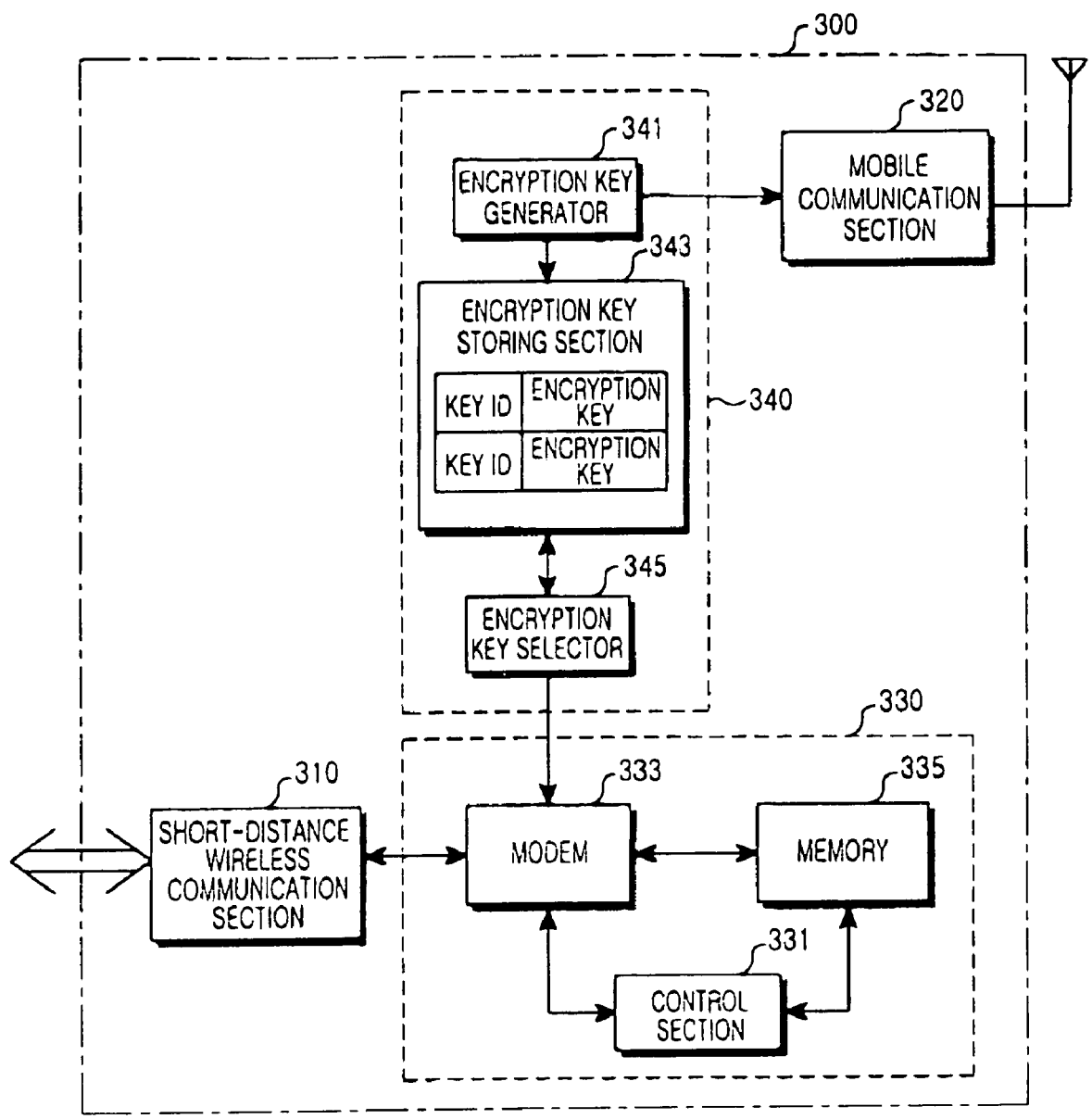
FIG. 3 is a construction diagram of a service providing terminal according to the first embodiment of the present invention.

The service providing terminal 300 provides mass data of various contents, such as MP3 music files, moving pictures or a plurality of still pictures. The service providing terminal 300 comprises a short-distance wireless communication section 310, a mobile communication section 320, a service providing section 330 and a secret key generating section 340. The service providing terminal 300 generates an encryption key and transmits it to the integrated terminal 100. Also, the service providing terminal 100 encrypts and decrypts data using the encryption key to perform data communications. The detailed construction of the service providing terminal 300 is shown in FIG. 3.

In a secure communication system having the construction mentioned above, when the integrated terminal 100 makes a standard insecure connection to the service providing terminal 300 to demand data corresponding to a particular content, the service providing terminal 300 demands an ID of the integrated terminal 100. The ID assigned to distinguish the integrated terminal 100 can be the telephone number of the integrated terminal 100. Upon receiving the ID, the service providing terminal 300 generates an encryption key and a key ID and transmits them to the integrated terminal 100 via the mobile communication system 200.

Figure 5:
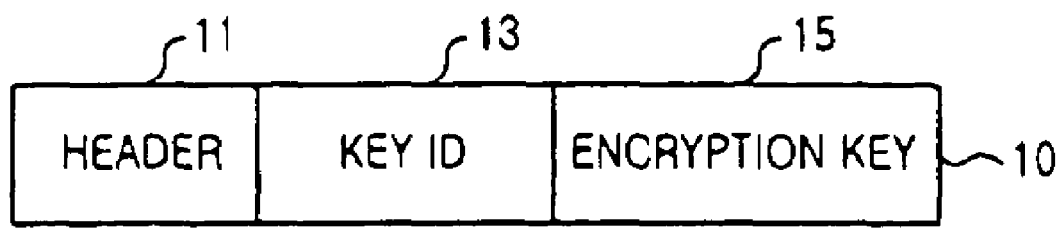
FIG. 5 shows the construction of a message according to the first embodiment of the present invention.
Figure 6:
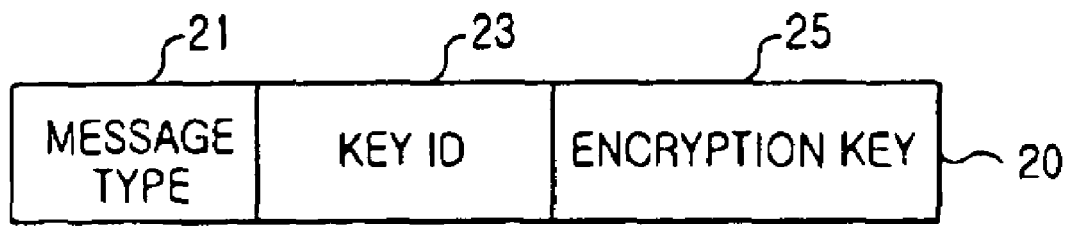
FIG. 6 shows the construction of a message according to a second embodiment of the present invention.

The encryption key is a code used in the encryption of data. The key ID makes a one-to-one correspondence with the encryption key to distinguish the connecting session at which the encryption key has been used. The encryption key and the key ID can be transmitted in a short message form using an existing protocol in the mobile communication system 200 or in a call incoming message. Alternatively, the encryption key and the key ID can be transmitted in a newly defined signal message. When the encryption key and the key ID are transmitted in a short message form according to the first embodiment of the present invention, the short message has the construction as shown in FIG. 5. FIG. 5 shows the construction of a message according to the first embodiment of the present invention. An encryption key short message 10 comprises a header 11, a key ID field 13 and an encryption key field 15. The header 11 includes a particular pattern of code showing that the short message 10 transmits an encryption key. Accordingly, when the integrated terminal 100 receives the encryption key short message 10, it detects a particular pattern of code for a short message including an encryption key and transmits the code to the encryption processing section. The key ID field 13 stores key ID information, whereas the encryption key field 15 stores encryption key information. If a new message form for transmitting an encryption key is defined, it will have the construction as shown in FIG. 6. FIG. 6 shows the construction of a message according to the second embodiment of the present invention. An encryption key transmitting message 20 comprises a message type field 21, a key ID field 23 and an encryption key field 25. The message type field 21 is a field showing that the encryption key transmitting message 20 is a message for transmitting an encryption key. The key ID field 23 stores key ID information, whereas the encryption key field 25 stores encryption key information. The embodiments of the present invention will be described in further detail, on the assumption that an encryption key is transmitted in a short message form.

The service providing terminal 300 transmits a demand for secure communication and a key ID to the integrated terminal 100. The integrated terminal 100 detects and receives an encryption key having the same key ID as it received. The integrated terminal 100 is then connected to the service providing terminal 300 in secure mode. The integrated terminal 100 and the service providing terminal 300 encrypt data using the encryption key in order to transmit and receive the data. This data encrypting process is the same as a conventional encrypting process using an encryption key.

The detailed construction of the integrated terminal 100 is shown in FIG. 2. FIG. 2 is a construction diagram of an integrated mobile communication terminal according to the first embodiment of the present invention. As shown in FIG. 2, the integrated terminal 100 comprises a mobile communication section 110, an encryption processing section 130 and a short-distance mobile communication section 120. The mobile communication section 110 is involved with communication with the mobile communication system 200. The mobile communication section 110 includes various functional sections (not shown), a control section (not shown) for the general control of the integrated terminal 100 and a memory section (not shown) for storing data. According to the present invention, the control section controls the mobile communication section 110, the encryption processing section 130 and the short-distance wireless communication section 120.

The short-distance wireless communication section 120 is a module for short-distance wireless communication, such as a Bluetooth, IrDA, USB or UART (serial communication) module.

The encryption processing section 130 encrypts data using an encryption key received under the control of the control section according to the present invention. The encryption processing section 130 includes an encryption key message detecting section 131, an encryption key and key ID detecting section 133, an encryption key storing section 135, an encryption key selector 137 and a modem 139. The encryption key message detecting section 131 detects an encryption key message among the messages received through the mobile communication section 110. For example, if the encryption key message detecting section 131 receives a short message, it will detect the header. If a code representing an encryption key short message is contained in the header information, the encryption key message detecting section 131 will transmit the received encryption key short message 10 to the encryption key and key ID detecting section 133.

The encryption key and key ID detecting section 133 extracts a key ID and an encryption key from the encryption key short message 10 and stores them at the encryption key storing section 135.

The encryption key storing section 135 stores a plurality of encryption key values to provide for the case when many secure short-distance connections are required at the same time. Encryption key values with expired validity are automatically deleted after a certain period of time so that they will not be used any more.

The encryption key selector 137 detects an encryption key having the same key ID as it received from the service providing terminal 300 and outputs the detected encryption key to the modem 139.

The modem 139 encrypts data inputted from the mobile communication section 110 using an encryption key applied from the encryption key selector 137 under the control of the control section and outputs the encrypted data to the short-distance wireless communication section 120. Also, the modem 139 demodulates the encrypted data, which was received from the service providing terminal 300 and inputted from the short-distance wireless communication section 120, using the encryption key and outputs the demodulated data to the mobile communication section 110.

The construction of the service providing terminal 300 will be explained in further detail with reference to FIG. 3. FIG. 3 is a construction diagram of the service providing terminal 300 according to the first embodiment of the present invention.

The service providing terminal 300 comprises a short-distance wireless communication section 310, an encryption key generating section 340, a mobile communication section 320 and a service providing section 330. The short-distance wireless communication section 310 is a module for short-distance wireless communication, such as a Bluetooth, IrDA, USB or UART module.

The mobile communication section 320 is involved with communication with the mobile communication system 200.

The service providing section 330 includes a control section 331, a memory 335 and a modem 333. The control section 331 performs general control of the service providing terminal 300 by controlling the mobile communication section 320 and the short-distance wireless communication section 310, as well as the service providing section 330.

The memory 335 stores service data provided from the service providing terminal 300, for example, MP3 music files, moving pictures and a plurality of still pictures.

The modem 333 modulates and demodulates data using an encryption key applied from the encryption key generating section 340 under the control of the control section 331. In other words, the modem 333 encrypts data inputted from the memory 120 using the encryption key and outputs the encrypted data to the short-distance communication section 310, while demodulating data inputted from the short-distance communication section 310 using the encryption key and outputting the demodulated data to the control section 331.

The encryption key generating section 340 comprises an encryption key generator 341, an encryption key storing section 343 and an encryption key selector 345. The encryption key generator 341 generates an encryption key and a key ID and stores them at the encryption key storing section 343 under the control of the control section 331.

The encryption key storing section 343 stores key IDs corresponding to a plurality of encryption keys.

The encryption key selector 345 selects an encryption key corresponding to a particular key ID under the control of the control section 331 and outputs the selected encryption key to the modem 333.

Figure 4:
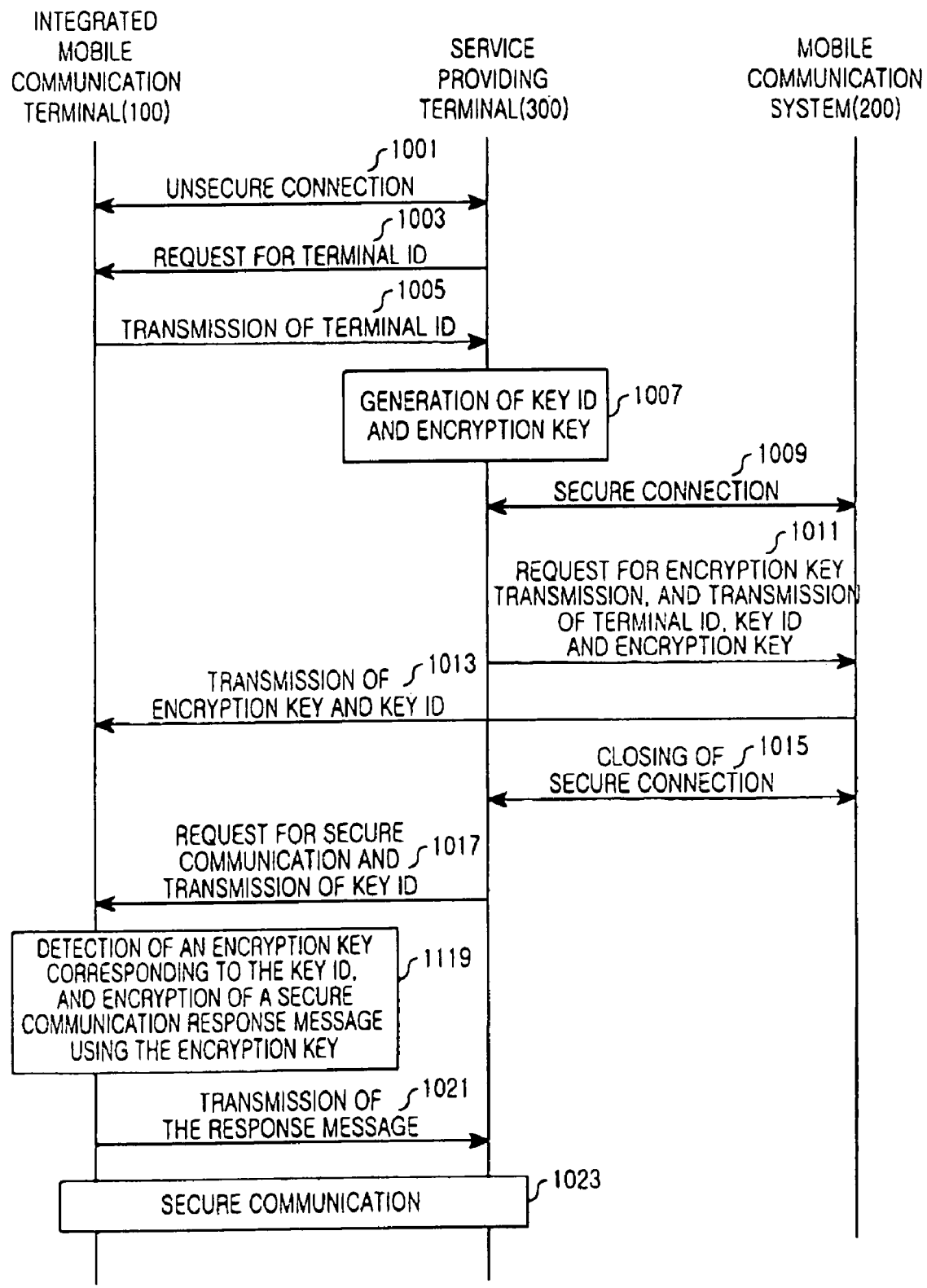
FIG. 4 is a message flow diagram for authentication and secure communication according to the first embodiment of the present invention.

FIG. 4 illustrates the flow of a message transmitted according to the secure communication process between the integrated terminal 100 and the service providing terminal 300. Referring to FIG. 4, the integrated terminal 100 is connected in insecure mode to the service providing terminal 300 at step 1001 in order to receive a service from the service providing terminal 300. At step 1003, the service providing terminal 300 sends a demand for a terminal ID to the integrated terminal 100. At step 1005, the integrated terminal 100 transmits the terminal ID to the service providing terminal 300. The terminal ID is published information peculiar to the integrated terminal 100, which can be used to call the integrated terminal 100 through the mobile communication system 200. The terminal ID can be the telephone number of the integrated terminal 100. At step 1007, the service providing terminal 300, which has received the terminal ID, generates an encryption key corresponding to the key ID through the encryption key generator 341 and proceeds with step 1009. At step 1009, the service providing terminal 300 makes a secure connection to the mobile communication system 200 and proceeds with step 1011. The secure connection is continued to the integrated terminal 100. At step 1011, the service providing terminal 300 sends a demand for an encryption key and transmits the terminal ID, the key ID and the encryption key to the mobile communication system 200. At step 1013, the mobile communication system 200 generates an encryption key short message, which includes the received key ID and encryption key, and transmits the message to the integrated terminal 100 to proceed with step 1015. At step 1015, the mobile communication system 200 closes the secure connection to the service providing terminal 300 and the integrated terminal 100. At step 1017, the service providing terminal 300 sends a demand for secure communication and a key ID to the integrated terminal 100. At step 1119, the integrated terminal 100 detects a corresponding encryption key using the key ID received at step 1017 and encrypts a secure communication response message using the detected encryption key to proceed with step 1021. At step 1021, the integrated terminal 100 transmits the response message. At step 1023, the integrated terminal 100 and the service providing terminal 300 encrypt data using the encryption key during short-distance wireless communication, and then transmit and receive the data to perform secure communication.

Figure 7:
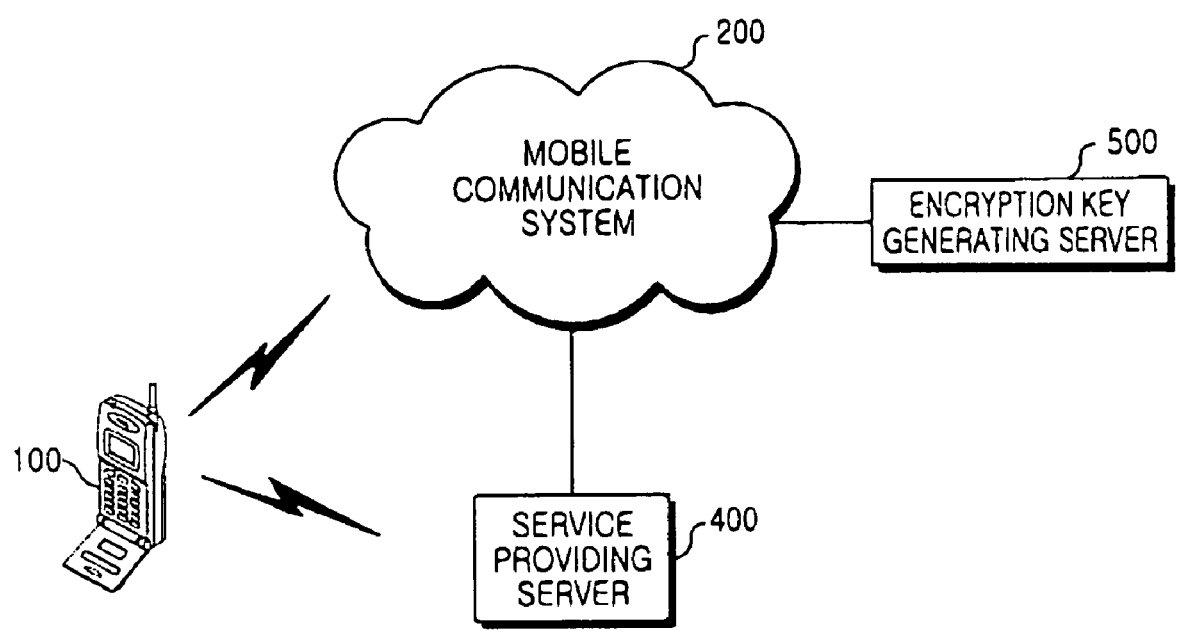
FIG. 7 is a construction diagram of a system according to the second embodiment of the present invention.
Figure 8:
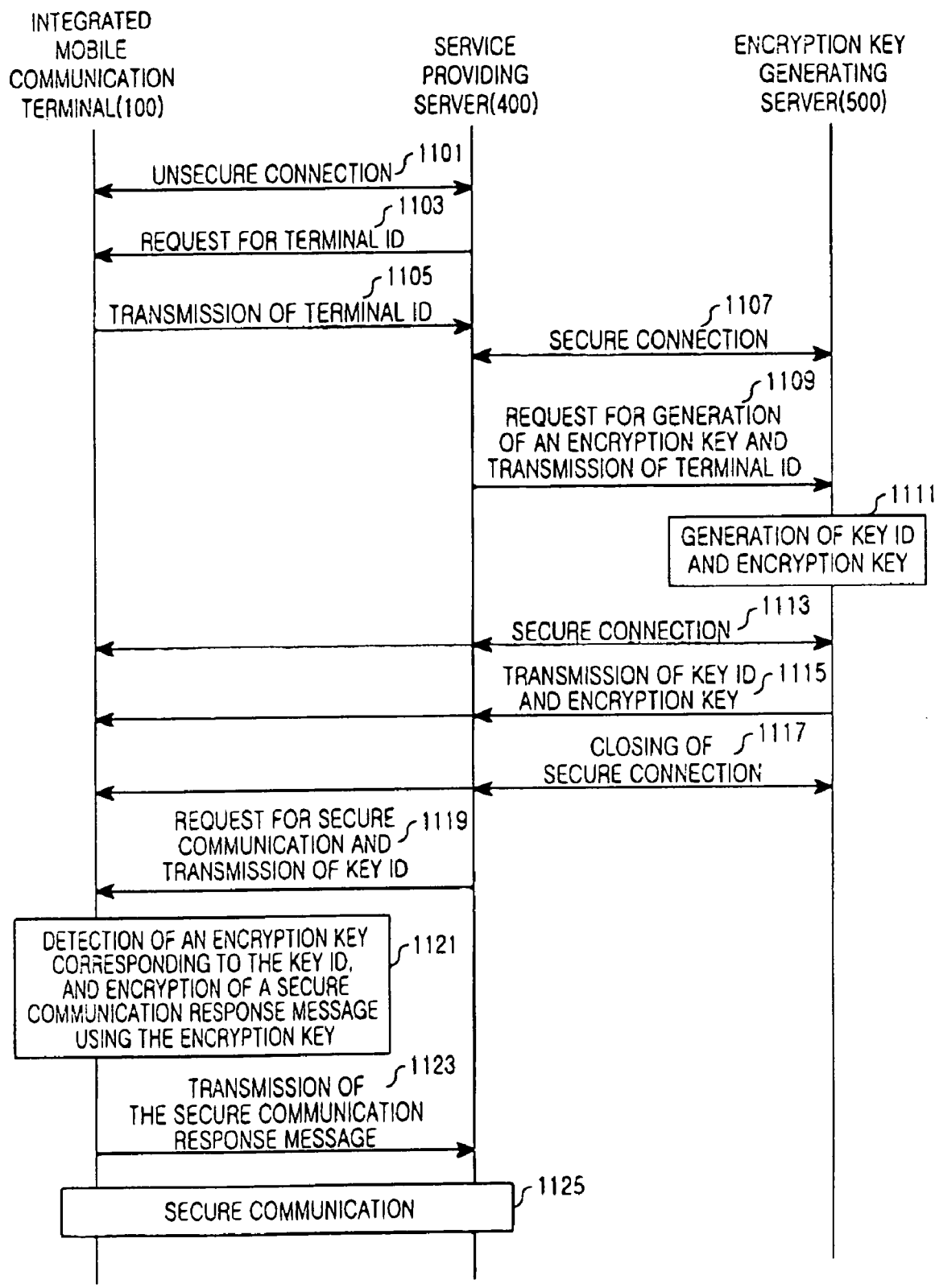
FIG. 8 is a message flow diagram for authentication and secure communication according to the second embodiment of the present invention.

The first embodiment of the invention as explained above includes the encryption generator in the service providing terminal. Hereinafter, the present invention will be described with reference to the second embodiment providing the encryption key generator as an independent node of the mobile communication system. FIG. 7 is a construction diagram of a system according to the second embodiment of the present invention. FIG. 8 is a message flow diagram for authentication and secure communication according to the second embodiment of the present invention.

Referring to FIG. 7, the secure communication system comprises an integrated terminal 100, a mobile communication system 200, a service providing server 400 and an encryption key generating server 500. The service providing server 400 is a terminal which provides mass data of various contents, such as MP3 music files, moving pictures or a plurality of still pictures. The construction of the service providing server 400 is similar to that of the integrated terminal 200 illustrated in FIG. 2. The service providing server 400 encrypts data using an encryption key received from the mobile communication system 200 and transmits the encrypted data to the integrated terminal 100 through short-distance wireless communication.

The encryption key generating server 500 generates a key ID and an encryption key according to the demand from the service providing server 400 and transmits them to the integrated terminal 100 and the service providing server 400 via the mobile communication system 200. The construction of the encryption key generating server 500 is similar to that of the encryption key generating section of the service providing terminal 300 as illustrated in FIG. 3.

In the secure communication system having the construction mentioned above, the integrated terminal 100 demands a service from the service providing server 400. The service providing server 400 demands an encryption key from the encryption key generating server 500 to provide a service through secure communication. Accordingly, the encryption key generating server 500 generates an encryption key and a key ID and transmits them to the integrated terminal 100 and the service providing server 400. The integrated terminal 100 and the service providing server 400 perform secure communication using the received encryption key.

The above process of secure communication is shown in FIG. 8. Referring to FIG. 8, the integrated terminal 100 makes an insecure connection to the service providing server 400 at step 110 to receive a service. At step 1103, the service providing server 400 demands a terminal ID of the integrated terminal 100. At step 1105, the integrated terminal 100 transmits its own terminal ID to the service providing server 400. At step 1107, the service providing terminal, when receiving the terminal ID, makes a secure connection to the encryption key generating server 500 and the mobile communication system 200. At step 1109, the service providing server 400 sends a demand for generation of an encryption key and the terminal ID to the encryption key generating server 500. The encryption key generating server 500 generates a key ID and an encryption key at step 1111 and proceed with step 1113. At step 1113, the encryption key generating server 500 makes a secure connection to the service providing server 400 and the integrated terminal 100. At this time, the secure connection type between the encryption key generating server 500 and the service providing server 400 may vary on need. However, the secure connection to the integrated terminal 100 must be a secure wireless communication method (for example, GSM ciphered data call or GSM ciphered signal-only channel) performing authentication and encryption in the mobile communication system. At step 1115, the encryption key generating server 500 transmits the key ID and the encryption key to the service providing server 400 and the integrated terminal 100 and proceeds with step 1117. At step 1117, the encryption key generating server 500 closes the secure connection to the service providing server 400 and the integrated terminal 100. At step 1119, the service providing server 400 transmits a demand for secure communication and a key ID. At step 1121, the integrated terminal 100, which has received the demand for secure communication, detects a corresponding encryption key using the received key ID and encrypts a secure communication response message to proceed with step 1123. At step 1123, the integrated terminal 100 transmits the encrypted secure communication response message to the service providing server 400. At step 1125, the integrated terminal 100 and the service providing terminal 400 encrypt data using the encryption key in short-distance wireless communication, and transmit and receive the data to perform secure communication.

As explained above, the present invention provides an encryption code for encrypting data to be transmitted or received during short-distance communication, namely, an encryption key generator for generating an encryption key, in order to transmit an encryption key to an integrated mobile communication terminal and a service terminal during short-distance secure communication. The two terminals encrypt data using the encryption key and receive or transmit the data, thereby implementing authentication and secure communication.

While the invention has been shown and described with reference to certain preferred embodiments thereof, it will be understood by those skilled in the art that various changes in form and details may be made therein without departing from the spirit and scope of the invention as defined by the appended claims. For example, the secure communication according to the present invention can be made in a short-distance wireless communication between two integrated terminals 100, as well as in a short-distance wireless communication between the integrated terminal 100 and the service providing server 400 according to the second embodiment. Therefore, this invention is not to be unduly limited to the embodiments set forth herein, but to be defined by the appended claims and equivalents thereof.

What is claimed is:

1. A method for short-distance wireless secure communication between communication terminals comprising a short-distance wireless communication module, said method comprising the steps of:

demanding generation of an encryption key for short-distance wireless secure communication between one communication terminal and another communication terminal;

generating an encryption key and a corresponding key ID according to the demand for encryption key generation and transmitting the encryption key and the key ID to both communication terminals via a secure connection wherein said encryption key and said key ID are transmitted in an exclusive encryption key transmitting message; and encrypting and decrypting data transmitted through short-distance wireless communication using the encryption key received by both communication terminals.

2. The method according to claim 1, wherein, when an encryption key is generated according to said demand for encryption key generation, a key ID corresponding to the encryption key is also generated.

3. A method for short-distance wireless secure communication between an integrated mobile communication terminal and a service providing terminal generating an encryption key, through short-distance wireless communication modules provided in both terminals, said method comprising the steps of:

said integrated mobile communication terminal's demanding a service from said service providing terminal through short-distance wireless communication;

said service providing terminal's demanding a number of said integrated mobile communication terminal, generating an encryption key and a corresponding key ID upon receiving the number and demanding transmission thereof;

transmitting the encryption key and the key ID to said integrated mobile communication terminal via a secure connection according to said demand for transmission;

said integrated mobile communication terminal's receiving and storing the encryption key and the key ID;

said service providing terminal's transmitting the key ID through short-distance wireless communication and demanding secure communication; and said integrated mobile communication terminal's detecting an encryption key corresponding to the received key ID, among a plurality of encryption key stored therein, encrypting data using the detected encryption key and transmitting the data to implement secure communication.

4. A method for short-distance wireless secure communication in a mobile communication system which comprises an integrated mobile communication terminal comprising a short-distance wireless communication module, a service providing server and an encryption key generating server, said method comprising the steps of:

said integrated mobile communication terminal's demanding a service from said service providing server through short-distance wireless communication;

said service providing server's demanding a number of said integrated mobile communication terminal, transmitting the number upon receipt to said encryption key generating server and demanding generation of an encryption key;

said encryption key generating servers's receiving said number, generating an encryption key and a corresponding key ID upon said demand for generation and transmitting the encryption key and the key ID to said integrated mobile communication terminal and said service providing server via a secure connection;

said service providing server's transmitting the key ID through short-distance wireless communication and demanding secure communication; and said integrated mobile communication terminal's detecting an encryption key corresponding to the key ID which has been received, among a plurality of encryption keys stored therein, encrypting data using the detected encryption key and transmitting the data.

5. The method according to claim 4, wherein said encryption key and said key ID are transmitted in a short message form.

6. The method according to claim 4, wherein said encryption key and said key ID are transmitted in a call incoming message.

7. The method according to claim 4, wherein said encryption key and said key ID are transmitted in an exclusive encryption key transmitting message.

8. A short-distance wireless secure communication system comprising:

an integrated mobile communication terminal, which comprises a short-distance wireless communication module, for demanding generation of an encryption key, if secure communication is required during short-distance communication between said integrated mobile communication terminal and another terminal, and for encrypting and decrypting data received or transmitted during short-distance wireless communication with the other terminal using an encryption key which has been received via a secure connection; and an encryption key generator for generating an encryption key and a key ID according to the demand for encryption key generation and transmitting the encryption key and the key ID to the integrated mobile communication terminal and the other terminal wherein said encryption key and said key ID are transmitted in an exclusive encryption key transmitting message.

9. A short-distance wireless secure communication system comprising:

a mobile communication system;

an integrated mobile communication terminal comprising: a short-distance wireless communication section; a mobile communication section; and an encryption processing section for storing an encryption key received from said mobile communication system and a key ID corresponding to said encryption key, detecting an encryption key corresponding to the key ID received through short-distance wireless communication, encrypting data inputted from said mobile communication section using the detected encryption key in order to output the encrypted data to said short-distance wireless communication section, and decrypting data inputted from said short-distance wireless communication section in order to output the decrypted data to said mobile communication section; and a service providing terminal comprising: an encryption key generating section for generating and storing a plurality of encryption keys and a plurality of corresponding key IDs, and selecting and outputting an encryption key and a key ID among the stored encryption keys and key IDs; a mobile communication section for transmitting the encryption key and key ID outputted from said encryption key generation section; a short-distance wireless communication section for transmitting said key ID; and a service providing section for encrypting data to be sent during secure communication using the encryption key outputted from said encryption key generating section and decrypting the encrypted data received through said short-distance wireless communication section.

10. A short-distance wireless secure communication system comprising:

a mobile communication system;

an integrated mobile communication terminal comprising: a short-distance wireless communication section; a mobile communication section; and an encryption processing section for storing an encryption key received from said mobile communication system and a key ID corresponding to said encryption key, detecting an encryption key corresponding to the key ID received through short-distance wireless communication, encrypting data to be sent during secure communication using the detected encryption key in order to output the encrypted data to said short-distance wireless communication section, and decrypting data inputted from said short-distance wireless communication section in order to output the decrypted data to said mobile communication section;

an encryption key generating server for generating and storing a plurality of encryption keys and a plurality of corresponding key IDs, and selecting an encryption key and a key ID among the stored encryption keys and key IDs to output them through said mobile communication system; and a service providing server for storing an encryption key and a key ID received from said mobile communication system, transmitting the key ID through short-distance communication section, encrypting data to be sent during secure communication using said encryption key, transmitting the encrypted data outputted through said short-distance communication section, and decrypting the encrypted data received from said short-distance wireless communication section.

11. A method for short-distance wireless secure communication between a mobile communication terminal and a service providing terminal generating an encryption key, through short-distance wireless communication modules provided in both terminals, said method comprising the steps of:

said mobile communication terminal's demanding a service from said service providing terminal through short-distance wireless communication;

said service providing terminal's generating an encryption key and a corresponding key ID according to said demand for service and transmitting the encryption key and the key ID to said mobile communication terminal via a predetermined secure channel;

said service providing terminal's transmitting the key ID to said communication terminal through short-distance wireless communication and demanding secure communication; and said mobile communication terminal's encrypting and decrypting service data in short-distance wireless communication using an encryption key corresponding to said received key ID.

* * * * *